(12) United States Patent
Barber (10) Patent No.: US 8,190,557 B2
(45) Date of Patent: May 29, 2012

(54) PROCESSOR AND METHOD CONFIGURED FOR EXECUTING DATA TRANSFER OR DATA ADJUSTMENT FUNCTIONS ON OLAP BASED DATA

(76) Inventor: Paul Grant Barber, Mississauga (CA)

( * ) Notice: Subject to any disclaimer, the term of this patent is extended or adjusted under 35 U.S.C. 154(b) by 365 days.

(21) Appl. No.: 12/625,589

(22) Filed: Nov. 25, 2009

(65) Prior Publication Data

US 2011/0125706 A1    May 26, 2011

(51) Int. Cl.
*G06F 17/30* (2006.01)
(52) U.S. Cl. .......................... 707/602; 707/601; 707/600
(58) Field of Classification Search .................. 707/600, 707/602
See application file for complete search history.

(56) References Cited

U.S. PATENT DOCUMENTS

| | | | | |
|---|---|---|---|---|
| 7,415,454 B2* | 8/2008 | Yan | ...................................... | 1/1 |
| 2002/0174141 A1* | 11/2002 | Chen | ............................ | 707/503 |
| 2008/0243823 A1* | 10/2008 | Baris et al. | ......................... | 707/5 |
| 2009/0006301 A1* | 1/2009 | Goetsch et al. | .................. | 706/47 |
| 2009/0248726 A1* | 10/2009 | Barber et al. | .................. | 707/101 |
| 2010/0169758 A1* | 7/2010 | Thomsen | ....................... | 715/212 |
| 2010/0278144 A1* | 11/2010 | Olofsson et al. | .............. | 370/331 |

* cited by examiner

*Primary Examiner* — Frantz Coby
(74) *Attorney, Agent, or Firm* — Bennett Jones LLP (57) ABSTRACT

A system and method for processing data between a source cell and a target cell in a OLAP database. The system comprises a component configured for selecting a source cell based on dimensions in the OLAP database and having a value derived from the OLAP database, and a component for selecting a target cell based on dimensions in the OLAP database. The system includes a component configured for receiving a modification amount and applying the modification amount to the source cell and a component configured for applying the modification amount to the target cell and generating a modified target cell value. The system further comprises a component configured for storing the modified source cell and/or the modified target cell in the OLAP database. According to an embodiment, the modification amount is applied to the target cell as a credit amount or as a debit amount.

15 Claims, 11 Drawing Sheets

FIG. 6(iii)

FIG. 6(vii)

PROCESSOR AND METHOD CONFIGURED FOR EXECUTING DATA TRANSFER OR DATA ADJUSTMENT FUNCTIONS ON OLAP BASED DATA

FIELD OF THE INVENTION

The present invention relates to computer systems and more particularly, to a processor configured for executing data transfer and/or data adjustment functions on OLAP based data.

BACKGROUND OF THE INVENTION

Online analytical processing or OLAP is a technique in business intelligence applications and comprises providing answers to analytical queries that are multidimensional in nature. Examples of OLAP applications include business reporting for sales, marketing, management reporting, business process management, budgeting and forecasting, financial reporting and the like.

Databases configured for OLAP applications typically comprise a multidimensional data model, often referred to as a "cube". A multidimensional data model allows for complex analytical queries with rapid execution time. The cube structure comprises aspects of navigational databases and hierarchical databases.

An OLAP cube can be thought of as an extension of the two-dimensional array of a spreadsheet, and comprises dimensions. In the context of an OLAP cube, dimensions provide additional methods for analyzing data. For example, an OLAP cube can be configured to allow a company to analyze financial data by product, by time-period, by city, by type of revenue and cost, and by comparing actual data with a budget. In a further aspect, a user, for example, a financial analyst, may want to view the data in various ways, such as displaying all the cities down the page and all the products across a page. This could be for a specified period, version and type of expenditure. Having seen the data in this particular way the analyst might then immediately wish to view it in another way. The cube structure provides the capability to re-orient the display so that the data displayed now had periods across the page and type of cost down the page. Because this re-orientation involved re-summarizing very large amounts of data, this new view of the data had to be generated efficiently to avoid wasting the analyst's time, i.e. within seconds, and less time than a relational database and conventional report-writer might have taken. According to another aspect, data in a cube may be updated at times, perhaps by different people. This can lead to errors being made, and requiring that corrections or adjustments be made. According to another aspect, it may be desirable to move data between cells (e.g. entities) while preserving the totals, for example, to correct errors or make other evaluations or projections.

It will be appreciated that while an OLAP cube provides a flexible and multidimensional structure data model, there remains a need in the art for improvements, such as, data applications including data acquisition and processing techniques capable of exploiting the capabilities of an OLAP cube.

SUMMARY OF THE INVENTION

The present invention provides a method and a processor configured for executing data transfer or data adjustment functions or both on OLAP-based data.

According to one aspect, there is provided a system for processing data between a source cell and a target cell for an OLAP database, the system comprising: a component configured for selecting one or more source dimension members that define the source cell and the source cell having a value derived from the OLAP database; a component configured for selecting one or more target dimension members that define the target cell; a component configured for receiving an adjustment value and applying the adjustment value to the source cell value; a component configured for applying the adjustment value to the target cell to generate a modified target cell value; and a component configured for storing the modified source cell value in the OLAP database, and a component configured for storing the modified target cell value in the OLAP database.

According to another aspect, there is provided a computer-implemented method for processing data between a source cell and a target cell for an OLAP database, the method comprises: selecting one or more source dimension members that define the source cell and the source cell having a value derived from the OLAP database; selecting one or more target dimension members that define the target cell; receiving an adjustment value as an input and applying said adjustment value to the source cell value; applying the adjustment value to the target cell to generate a modified target cell value; and storing the modified source cell value in the OLAP database, and storing the modified target cell value in the OLAP database.

According to a further aspect, there is provided a computer program product for processing data between a source cell and a target cell for an OLAP database, the computer program product comprises: a storage medium configured to store computer readable instructions; the computer readable instructions including instructions for, selecting one or more source dimension members that define the source cell and the source cell having a value derived from the OLAP database; selecting one or more target dimension members that define the target cell; receiving an adjustment amount and applying the adjustment amount to the source cell value; applying the adjustment amount to the target cell to generate a modified target cell value; storing the modified source cell value in the OLAP database; and storing the modified target cell value in the OLAP database.

Other aspects and features of the present invention will become apparent to those ordinarily skilled in the art upon review of the following description of embodiments of the invention in conjunction with the accompanying figures.

BRIEF DESCRIPTION OF THE DRAWINGS

Reference will now be made to the accompanying drawings which show, by way of example, embodiments of the present invention, and in which:

FIGS. 6(i) to 6(vii) are exemplary screen shots showing the operation of the data processor according to another example.

Like reference numerals indicate like or corresponding elements or components in the drawings.

DETAILED DESCRIPTION OF THE EMBODIMENTS OF THE INVENTION

Embodiments according to the present invention are described below by way of a set of screen shots that would be displayed to a user of the system. The screen shots comprise exemplary data or information used by companies for planning, budgeting, monthly financial reporting and/or consolidation of financial results. In the context of the present description, numerical data is stored in an OLAP database, and comprises one or more cubes. Each cube comprises a structure based on dimensions and members.

The cubes and dimensions will vary from company to company. In addition, the names of dimensions within cubes can vary. For instance, a cube can have dimensions named "Accounts", "Versions" and "Time", and a number of other dimensions with other names. Each dimension comprises a list of members. For example, an "Organization" dimension in a cube comprises a list of departments and reporting entities for a company. The dimensions can also have a calculation structure that describes data aggregation, e.g. 'East Region'='New York' plus 'Boston', or a calculation structure that describes a more complex calculation, e.g. 'Benefits'=10% of 'Salaries'. It will be appreciated that calculations can also be different for each company.

In the context of the present description, data is stored in an OLAP database as a single numerical value for each dimension combination. For example, if the dimensions are 'Time', 'Accounts', 'Version' and 'Organization', each of which has a member called 'January08', 'Salaries', 'Plan' and 'Boston' respectively, then one numeric value is stored for this combination of members. Similarly, a different number is stored in the database for February08', 'Salaries', 'Plan' and 'Boston'.

Typically, data is accessed (i.e. imported) in an OLAP database at a detailed level, for example, using the 'Time', 'Accounts', 'Version' and 'Organization' dimensions (e.g. 'January08', 'Salaries', 'Plan' and 'Boston'). The data is then processed and reported at an aggregated level to provide historical information, for example, according to the dimensions, 'Total Year', 'Total Expenses', 'Plan' and 'Total Company'.

As will be described in more detail below, the present invention comprises embodiments of a processing mechanism, process, or processor for taking a cell in an OLAP cube and making adjustments or moving the cell data between entities. According to another aspect, the present invention comprises embodiments of a processing mechanism, process, or processor for allowing cell data to be moved between entities while preserving the totals.

In accordance with embodiments of the present invention a system and techniques (e.g. computer-implemented processes) are described in more detail below for accessing data in an OLAP database and configuring processes for adjusting the data or moving the data between entities (e.g. between a source member and a target member).

Figure 1:
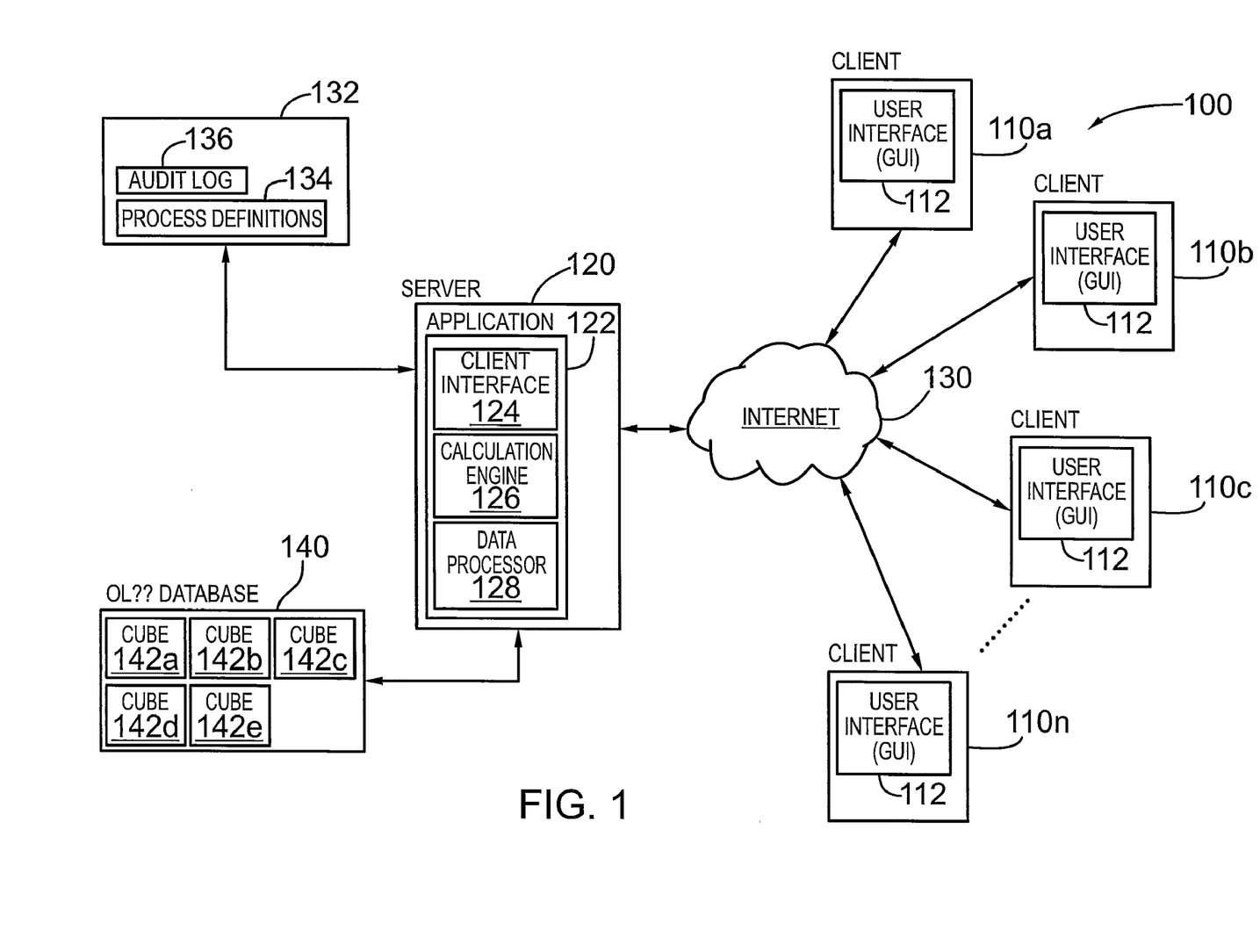
FIG. 1 shows in diagrammatic form an exemplary system for operating or executing methods or processing in accordance with an embodiment of the invention.

Reference is made to FIG. 1, which shows in diagrammatic form an exemplary operating environment and configuration for implementing and practising a system and processes according to embodiments of the present invention. The operating environment according to an embodiment and indicated generally by reference 100 comprises a client/server configuration. As shown, one or more clients 110, indicated individually by references 110a, 110b, 110c, . . . 110n, access a server indicated by reference 120, for example, through a network 130. The network 130 may comprise a local area network (LAN), a wide area network (WAN), the Internet or any combination thereof. As shown the server 120 interfaces with a database 140. According to an embodiment, the database 140 is configured as an OLAP database and comprises a number of cubes 142, indicated individually by references 142a, 142b, 142c, 142d, 142e, . . . . The cubes 142 are configured with dimensions and members as described above and in further detail below. For the embodiment depicted in FIG. 1, the clients 110 are connected via the Internet indicated generally by reference 130. It will be appreciated that the method and system according to the present invention may be practised or implemented for other networks and/or configurations.

According to an embodiment, the system 100 includes a storage module indicated generally by reference 134. The storage module 134 is configured to store data process definitions, for example, as defined by a user. According to another embodiment, the data process definitions are stored or run on the user or client machine. According to an embodiment, the storage module 134 is implemented using a relational data structure or configuration.

As shown in FIG. 1, the server 120 is configured with an application indicated generally by reference 122. According to an embodiment, the application 122 comprises a client interface module 124, a calculation engine module 126 and a data adjustment/transfer module or processor (e.g. processing mechanism(s) configured for performing data adjustment and/or transfer functions) 128.

The client interface module 124 is configured to provide an interface with the client machines 110. According to an embodiment, the client interface module 124 is implemented with a user interface or GUI (Graphical User Interface) which runs on each of the client machines 110 as indicated generally by reference 112. According to an embodiment, the client interface module 124 and the user interface 112 comprise logic and processes configured to provide a user with the capability to specify a processing request for data in the database 140, i.e. a process for querying structural component (s) associate with one of the cubes. According to an embodiment, the application 122 includes a module for storing processes specified by a user in the database, for example, in the storage module 134.

The calculation engine module 126 comprises a computer-implemented process(es) or function(s) that runs on the server 120 and performs manipulation of data in the cube 142 according to a specification, i.e. a data process specified and provided by the user through the user interface 112. According to an embodiment, the execution of a data process is independent of the specification of the data process. For example, a data process can be executed multiple times and the execution of a data process can be scheduled to run at any time. According to an embodiment, the calculation engine is configured to execute process definition(s) retrieved or returned from the storage module 134.

Embodiments of the application 122, the client interface module 124, and the calculation engine module 126 are described in co-pending U.S. patent application Ser. No. 12/059,070, which was filed on Mar. 31, 2008 and is owned by the assignee in common with the subject application. The disclosure of U.S. patent application Ser. No. 12/059,070 is hereby incorporated by this reference in its entirety.

The data processor or module 128 comprises a computer-implemented process(es) or function(s) that runs on the server 120 and provides a mechanism to transfer and/or modify data in any cell in the cube 142. According to an embodiment, the data processor or module 128 is configured to provide the capability to make transfers to cell data, between entities, for example, move $1000 in sales incorrectly posted to the "Production Department" to the "Sales Department". According to another aspect, the data processor module 128 is configured to allow a user to move cell data between entities while preserving totals, for example, take $1000 from "July Trade Show" expenses and move it to "September Direct Mail" expenses. The operation of the data processor module 128 according to embodiments of the invention is described in more detail below.

The functional configuration and operation of the data transfer and adjustment modules or components in the data processor 128 (FIG. 1) and the application 122 (FIG. 1) are now described in further detail with reference to the user interface and screen shots depicted in FIGS. 2 to 6.

Figure 2:
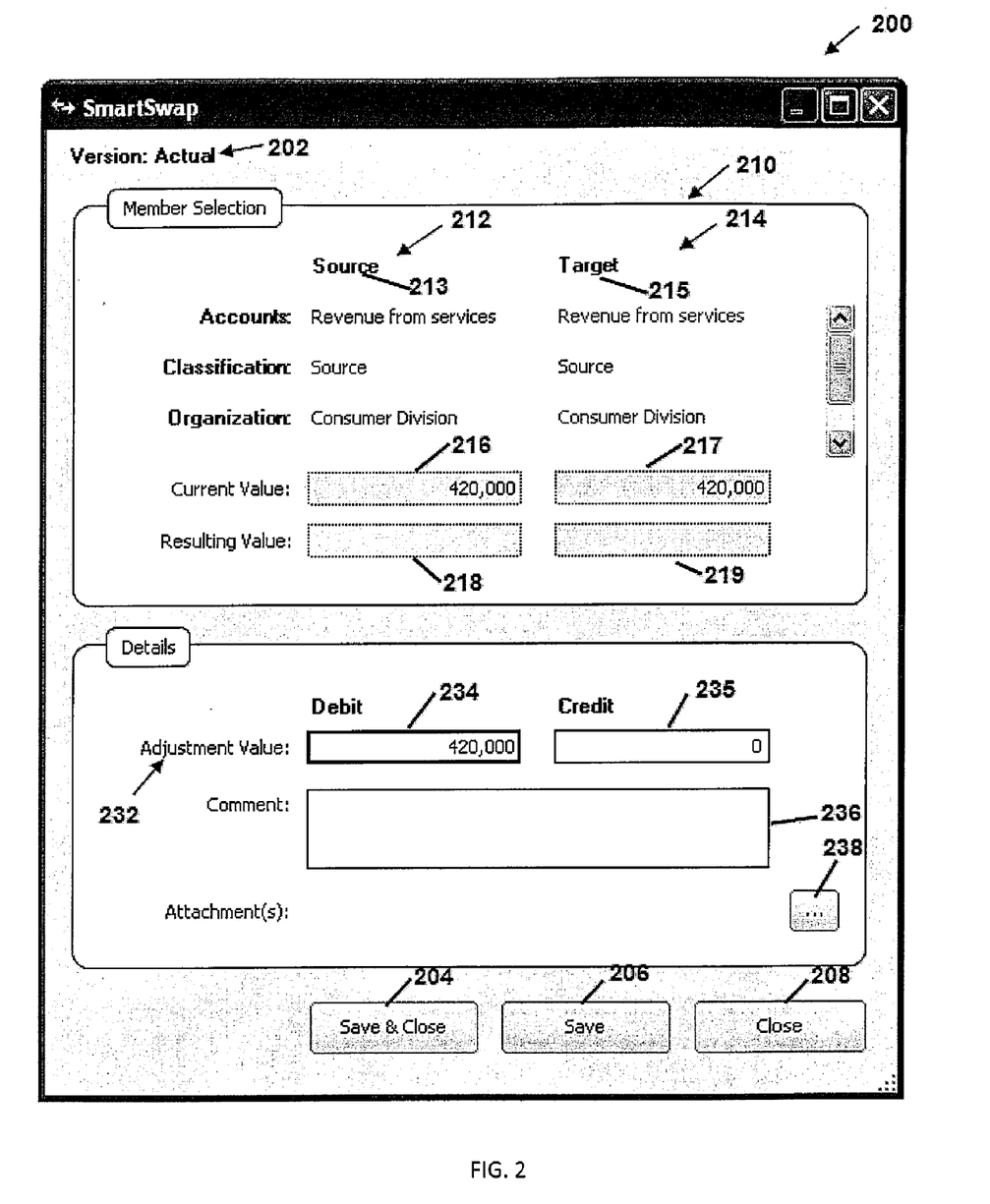
FIG. 2 is an exemplary screen shot of a data transfer processor screen for configuring the data transfer processor for an accounting type transaction according to an embodiment of the invention.
Figure 3:
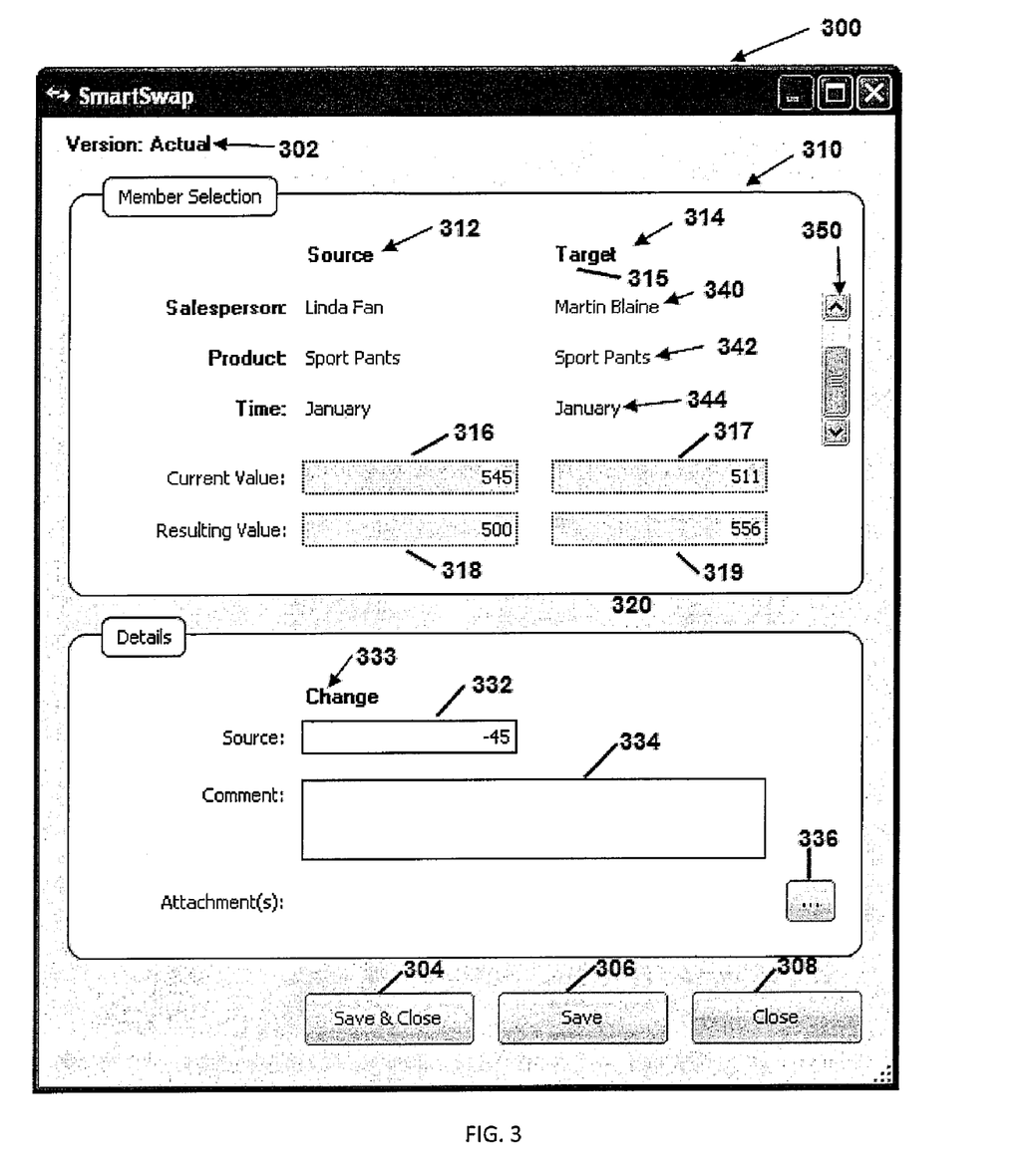
FIG. 3 is an exemplary screen shot of a data adjustment processor screen for configuring the data adjustment processor for a transaction in a "Statistical Account"

According to an embodiment, the application module 122 is configured with a graphical user interface comprising a data transfer screen or window as shown in FIG. 2, and indicated generally by reference 200. According to an embodiment, the data transfer screen 200 is configured together with a data transfer processor module for accounting applications and includes additional accounting processing, as will be described in more detail below. According to an embodiment, the application module 122 is configured with a data adjustment screen 300 and a data adjustment processor module as shown in FIG. 3. As will be described in more detail below, the data adjustment screen 300 is configured for non-accounting applications, e.g. statistical accounts.

Figure 4A:
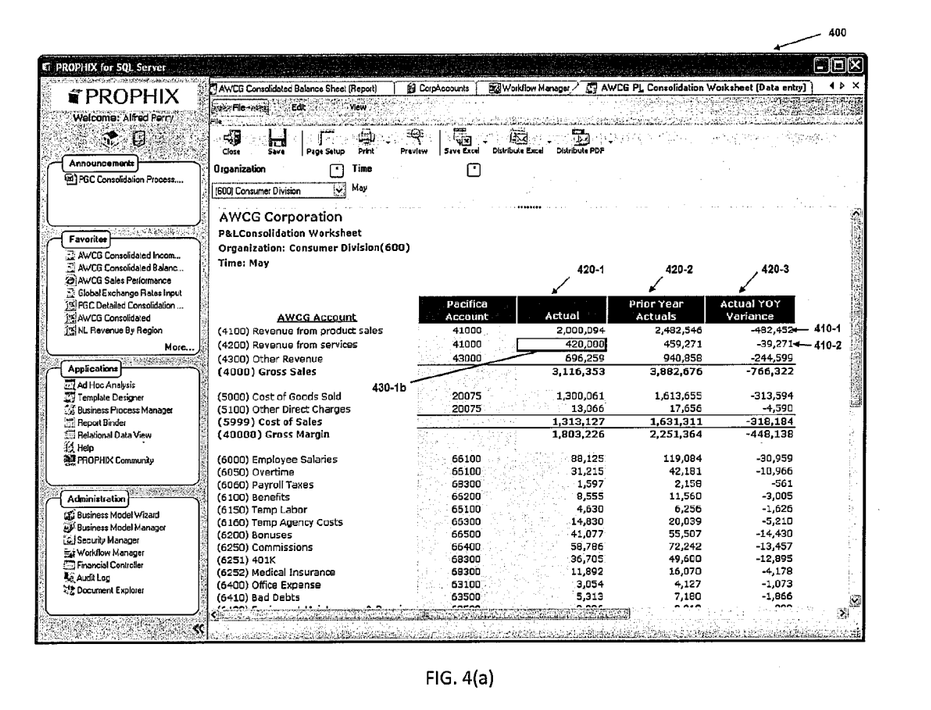
FIGS. 4(a) and 4(b) are exemplary screen shots of a "Data Analysis" report screen configured for accessing the data transfer processor according to an embodiment of the invention.
Figure 4B:
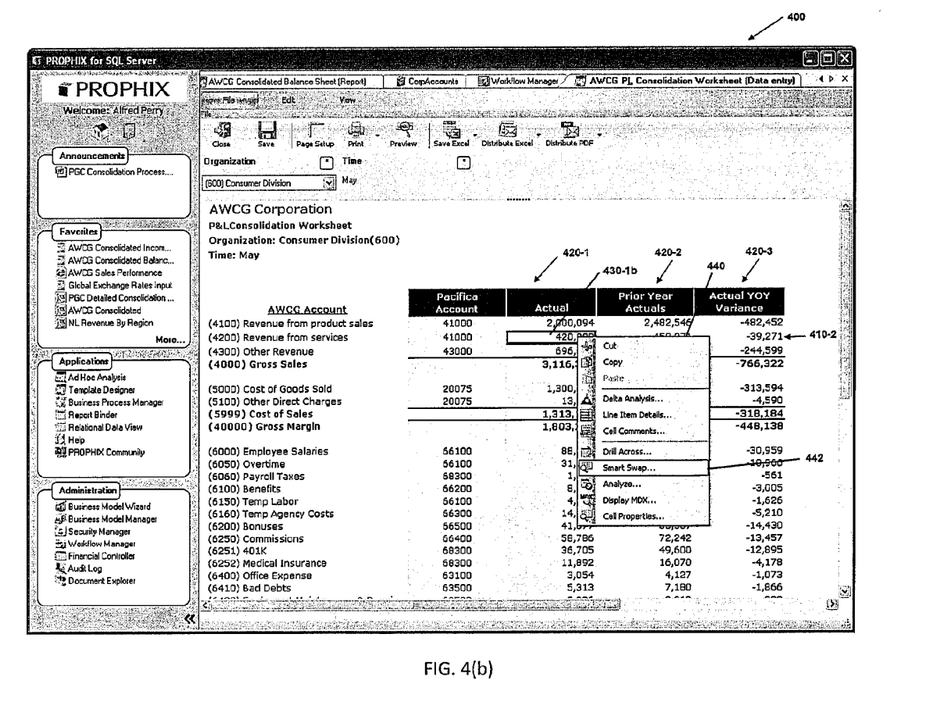

According to an embodiment, the data transfer screen 200 is accessed or displayed in response to a data object or cell being "clicked". For example, FIG. 4 shows a screenshot of a "Template Style" Report indicated generally by reference 400. In this example, the Template Style report 400 comprises a Profit and Loss Consolidation worksheet for the "AWCG Corporation" and is arranged in rows and columns as shown in FIG. 4. According to this aspect, each row 410 for columns 420-1, 420-2 and 420-3 in the report 400 comprises an active data object and corresponds to a cell or a tuple in the cube 142. In this example, column 420-1 shows the actual annual revenue or cost, column 420-2 shows the prior year actual revenue or cost, and column 420-3 shows the actual year-over-year variance. For example, the second row 410-2 in the column 420-1 represents the actual annual revenue (i.e. $420,000) for "Revenue from services" and comprises a data object indicated by reference 430-1*b*. According to an embodiment, the data objects comprise active elements and are responsive to a user activated device, e.g. a mouse, and in response to a mouse click, the application 122 (FIG. 1) is configured to display a drop-down menu box 440 having a form as shown in FIG. 4. According to an embodiment, the drop-down menu box 440 includes a menu item indicated by reference 442, which in this example is labeled "Smart Swap". Selecting or "clicking" the "Smart Swap" menu item 442 causes the application 122 to display the data transfer screen 200 as shown in FIG. 2.

Figure 5A:
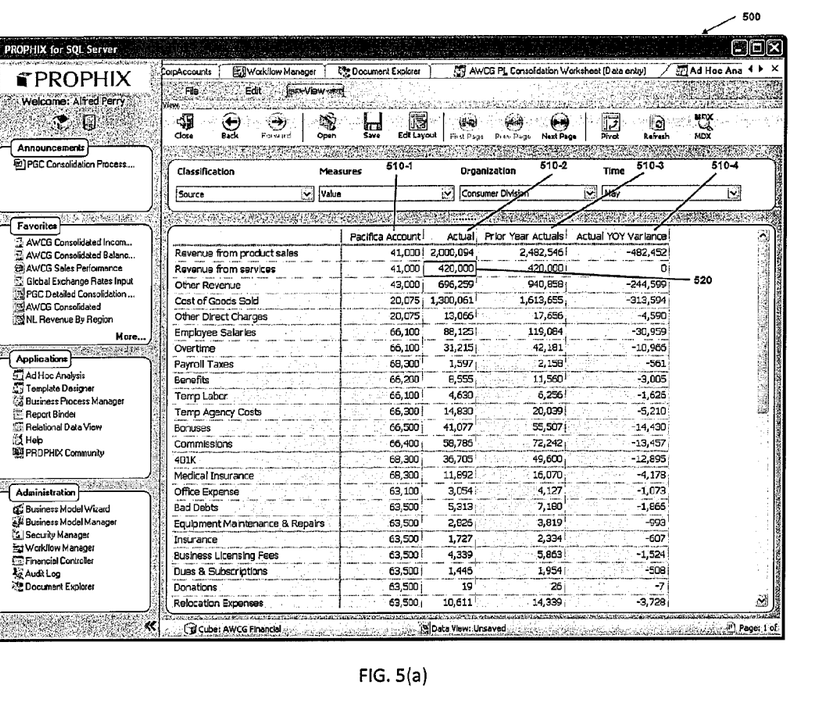
FIGS. 5(a) and 5(b) are exemplary screen shots of an "Ad Hoc" report screen configured for accessing the data transfer processor according to an embodiment of the invention.
Figure 5B:
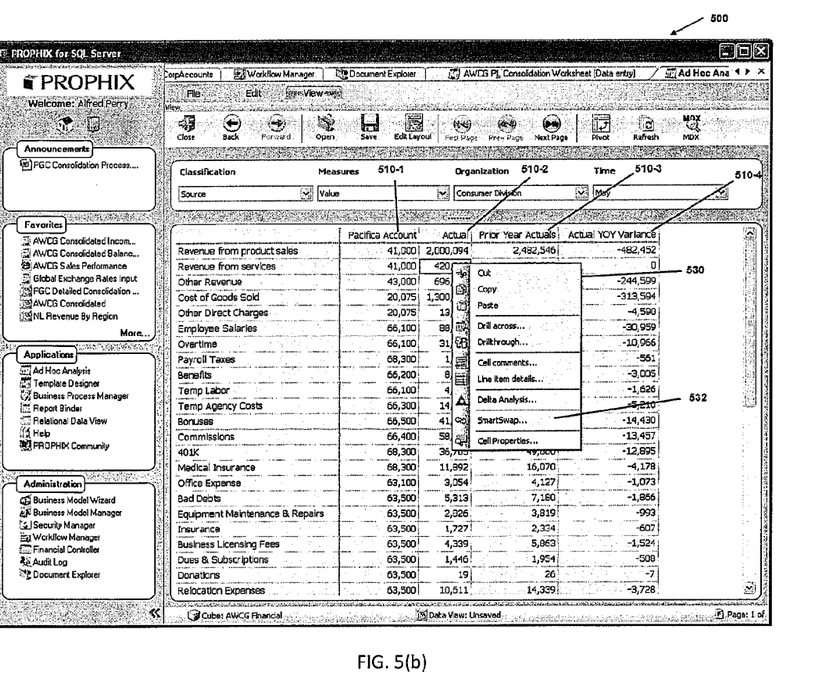

According to an embodiment, the data transfer screen 200 is also accessed or displayed from an "Ad Hoc" style report screen 500, for example, as depicted in FIGS. 5(*a*) and 5(*b*). The Ad Hoc screen 500 is another report style screen that is supported by the application 122. The Ad Hoc screen 500 comprises, for example, financial data arranged in columns and rows and is configured to allow a user to quickly select and optionally modify the data being displayed. According to an embodiment, the Ad Hoc screen 500 comprises one or more columns indicated generally by reference 510 of active data objects or cells indicated generally by reference 520. In a manner similar to the Template style report screen 400 (FIG. 4(*a*)), the data objects 520 on the Ad Hoc style screen 500 are configured to be responsive to a user input, e.g. a mouse click, and in response to being 'clicked', the Ad Hoc screen 500 operating under the control of the application 122 is configured to display a drop-down menu box 530 having a menu item 532, for example, a "Smart Swap" menu item, as shown in FIG. 5(*b*). The application 122 is configured to display the data adjustment screen 200 in response to the "Smart Swap" menu item 532 being clicked on the drop-down menu box 530.

According to an embodiment, the OLAP cubes are configured to include an "Accounts" dimension. The members of the Accounts Dimension comprise either "Accounting" type accounts or "Statistical" type accounts. According to another aspect, the Account accounts comprise either "Debit" accounts or "Credit" accounts.

According to an embodiment, the application 122 is configured to display the data transfer screen 200 if the user has write access privileges for the selected cell (e.g. the cell 430-1*b*), and/or the cell (e.g. the cell 430-1*b*) represents an "Accounting" account that can be edited and is a leaf member of the other dimensions. According to another embodiment, if the selected cell contains editable data corresponding to a "Statistical" account, then the data adjustment screen 300 is invoked, as will be described in more detail below.

Figure 6:
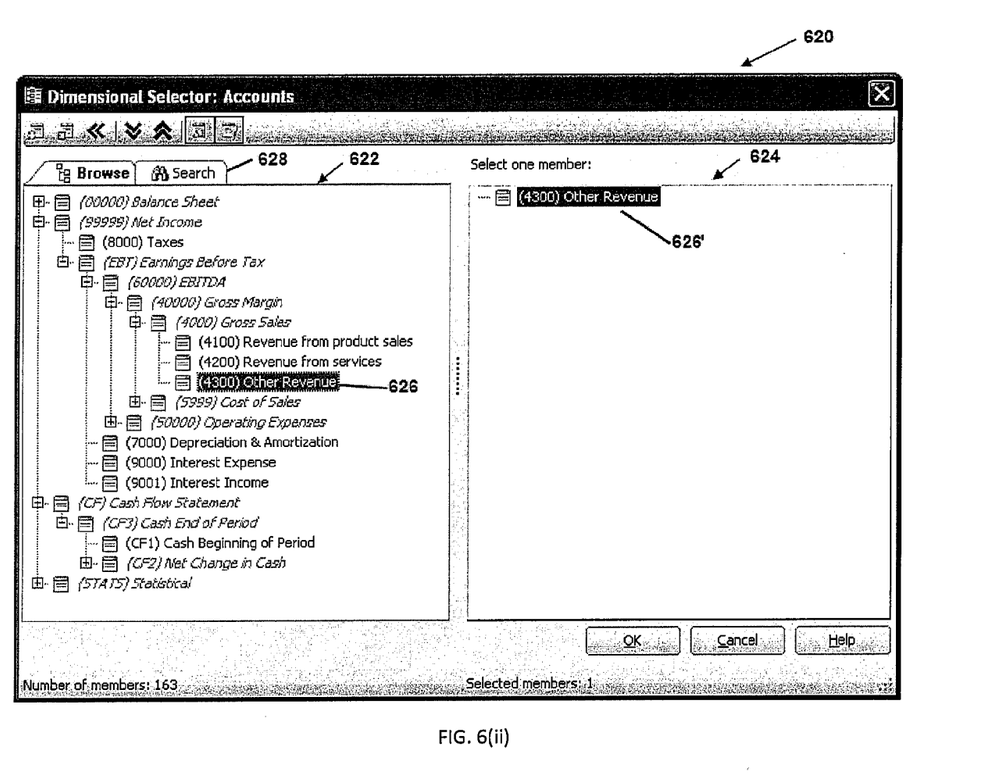

Reference is made back to FIG. 2. According to an embodiment, the data transfer screen 200 is configured with a "Member Selection" panel 210 and a "Details" panel 230. The Member Selection panel 210 comprises a "Source" dimension member 212 and a "Target" dimension member 214. The Source dimension member 212 is initialized to the dimension member values corresponding to the selected cell (i.e. the cell 430-1*b* in FIG. 4) in the calling screen, i.e. the Template style report screen 400 (FIG. 4) or the Ad Hoc style report screen 500 (FIG. 5). According to an embodiment, the Target dimension member 214 is initialized to the same member values as the source member, i.e. the default, and can be edited or changed by the user as described in more detail below. According to an embodiment, the Member Selection panel 210 includes an active field, "Target" 215 for the Target Member 214, for each of the dimensions that visible. The user clicks the current target dimensions selection 215 in FIG. 2 (or 315 in FIG. 3) for any dimension displayed there, and the system is configured to display a Dimension Selector dialog box or screen, for example, as shown in FIG. 6(*ii*). Using the dialog box controls, the user selects another member and the selected member appears in the screen 200 in place of the previously selected member. According to another aspect, the system is configured to refresh or recalculate the associated numerical data. As will be described in more detail below, the active field, for example, the Target field 215 allows the user to change the Target member 215 selected for the data operation. As shown, the Member Selection panel 210 includes a source "Current Value" field 216 and a source "Resulting Value" field 218. Similarly, the Member Selection panel includes a "Current Value" field 217 and a "Resulting Value" field 219 for the target dimension member. As shown, the source "Current Value" field is initialized to the current value of the selected cell (i.e. the cell 430-1*b* in FIG. 4), and by default the "Current Value" field 217 for the target member is initialized to the same value. In addition and according to an embodiment:

if the Source account 212 is a Credit account AND the Source Current Value 216 is positive, then the Adjustment Value Debit field 234 is set to the value of the Source Current Value field 216 and the Adjustment Value Credit field 235 is set to zero if the Source account 212 is a Credit account AND the Source Current Value 216 is negative, then the Adjustment Value Debit field 234 is set to zero and the Adjustment Value Credit field 235 is set to the absolute value of the Source Current Value field 216 if the Source account 212 is a Debit account AND the Source Current Value 216 is positive, then the Adjustment Value Debit field 234 is set to zero and the Adjustment Value Credit field 235 is set to the value of the Source Current Value field 216 if the Source account 212 is a Debit account AND the Source Current Value 216 is negative, then the Adjustment Value Debit field 234 is set to the absolute value of the value of the Source Current Value field 216, and the Adjustment Value. Credit field 235 is set to zero As also shown in FIG. 2, the data transfer screen 200 includes a "Version" field 202. The Version field 202 is configured for displaying the version of the selected cell, i.e. the cell from which the data transfer screen 200 is invoked. The data transfer screen 200 may also include a "Save & Close" button 204, a "Save" button 206 and a "Close" button 208, configured to function as described in more detail below. According to an embodiment, the following fields in the data transfer screen 200 are configured to be editable:

the members of the Target dimensions 214 can be edited according to rules as described in more detail below the Debit Adjustment Value field 234 and the Credit Adjustment Value field 235 can be edited to contain a numerical value the Comment field or box 236 can be edited to contain any text or comment According to an embodiment, the Target dimension member 214 is configured to be selectable by the user and can comprise any leaf, or editable members of the Account(s) or other dimension(s), for which the user has access or update privileges. A further example is described below with reference to FIGS. 6(i) to 6(vii). According to an embodiment, the data transfer screen 200 is configured to perform the following processing steps and validation when an accounts type target dimension member is selected:

if the selected accounts Target dimension member is a Statistical account, a warning message is displayed, for example, "Values cannot be transferred between Statistical Accounts and other account types", and on clicking an OK button (for example, as depicted in FIG. 6(ii)), the data transfer processor module (i.e. the data process 128 FIG. 1) is configured to return the user to the data transfer screen 200.

data is read from the OLAP cube from the cell corresponding to the target dimension member(s) selected by the user and the value read is displayed in the Current Value field 217 if the Target Account 214 comprises a Credit Account, then the Target Resulting Value field 218 is set to the value of the Target Current Value field 216 MINUS the value of the Adjustment Value Credit field 235 PLUS the value of the Adjustment Value Debit field 234 if the Target Account 214 is a Debit Account, then the Target Resulting Value field 218 is set to the value of the Target Current Value field 216 MINUS the value of the Adjustment Value Debit field 234 PLUS the value of the Adjustment Value Credit field 235

Referring back to FIG. 2, the "Details" panel 230 comprises an "Adjustment Value" field 232 comprising a "Debit" value input field 234 and a "Credit" value input field 235. As will be described in more detail below, the data transfer screen 200 and data transfer processor module are configured to provide the functionality for active data entry and manipulation operations. According to an embodiment, the data transfer screen 200 and data transfer processor module are configured to apply or transfer the Adjustment Value to the Target dimension member 214 either as a Credit amount or a Debit amount, dependent on whether the Adjustment value amount is entered in the Debit field 234 or in the Credit field 235. According to an embodiment, the data transfer screen 200 and the data transfer processor module are configured to adjust and display the resulting value for Source dimension member in the Resulting Value field 218 and adjust and display the resulting value for Target dimension member in the Resulting Value field 219, for example, according to the rules described below. For the Source Resulting Value field 218, the system is configured according to an embodiment to operate as follows:

if the Source account 212 is a Credit account, then Source Resulting Value field 218 is set to the SUM of the Source Current Value field 216 and the Adjustment Value Credit field 235 MINUS the Adjustment Value Debit field 234 if the Source account 212 is a Debit account, then Source Resulting Value field 218 is set to the SUM of the Source Current Value field 216 and the Adjustment Value Debit field 234 MINUS the Adjustment Value Credit field 235

For the Target Resulting Value field 219, the system is configured to operate as follows:

if the Target Account 214 is a Credit Account, then the Target Resulting Value field 219 is set to the value of the Target Current Value field 217 MINUS the value of the Adjustment Value Credit field 235 PLUS the value of the Adjustment Value Debit field 234 if the Target Account 214 is a Debit Account, then the Target Resulting Value field 219 is set to the value of the Target Current Value field 217 MINUS the value of the Adjustment Value Debit field 234 PLUS the value of the Adjustment Value Credit field 235

As shown in FIG. 2, the data transfer screen 200 includes the "Close" button 208 which allows a user to exit the screen 200 without saving any of the changes, i.e. the changes are not saved to the cube, and any comments are cancelled. According to another embodiment, the audit log(as described below) is also not changed.

On the other hand, if the user wishes to save the changes or save the changes and exit the data transfer screen 200, then the user 'clicks' either the Save button 206 or the Save&Close button 204. According to an embodiment, the cell represented by the Source selected members is set to the value of the Source Resulting Value field 218 and the cell represented by the Target selected members for all dimensions is set to the value of the Target Resulting Value field 219. According to an embodiment, the data transfer screen 200 is configured to perform the following validation process:

if the Target dimension member values are the same as the Source dimension member values, then a warning message is displayed, for example, "No data changes can be made because all Target dimension members are the same as the Source dimension members"

The user is returned to the data transfer screen 200, for example, in response to clicking an "OK" button. The operations outlined above can be implemented as processing and logic steps that are executed by the data transfer processor module in the data processor 128 (FIG. 1) operating under stored program control.

According to another embodiment, the data transfer screen 200 and the data transfer processor module (e.g. implemented in the data processor 128 FIG. 1) are configured to generate an audit log. According to an embodiment, the audit log comprises a data structure 136 (FIG. 1) configured in the storage module 132 (FIG. 1). According to an embodiment, the data structure 136 comprises the following data fields or elements for an exemplary audit log:

For:
Dim1: (Dim1MemberID)Dim1MemberDesc
Dim2: (Dim2MemberTD)Dim2MemberDesc
Dim3: (Dim3MemberID)Dim3MemberDesc
9,999.99 Debited in
Dim4: (Dim4AMemberID)Dim4AmemberDesc
Dim5: (Dim5A_MemberID)Dim5AMemberDesc
Dim6: (Dim6AMemberID)Dim6AmemberDesc
9,999.99 Credited in
Dim4: (Dim4BMemberID)Dim4BMemberDesc
Dim5: (Dim5BMemberID)Dim5BMemberDesc
Dim6: (Dim6BMemberID)Dim6BmemberDesc Where:
- "Dim1" to "Dim3" are the dimensions that were not changed between the Source and the Target (including the Version)
- "(Dim1MemberID)Dim1MemberDesc", "(Dim4MemberID)Dim4MemberDesc" to "(Dim4MemberID)Dim4MemberDesc are the selected members of those dimensions
- "Dim4 to Dim6" represent the dimensions that were changed between the Source and the Target
- "Dim4AmemberID" is the Dim4 member that was Debited and "Dim4BmemberID" is the Dim4 member that was Credited
- ($) 9,999.99 is either the Source Debit value or the Source Credit value, displayed using the numerical format configured for the cell from which the data adjustment screen was initiated. For example, the cell 430-1b in FIG. 4(a) shows "420,000"

According to an embodiment, the data structure for an audit log can include the following additional information or fields: User, Date and Time; Module; and Event and Category. The User, Date and Time fields correspond to the current user, the current date and the current time, respectively. The Module can be either "Templates" or "Ad Hoc Analysis", and will depend on how the data transfer screen 200 was accessed, for example, from the Templates screen 400 in FIG. 4(a) and FIG. 4(b), or the Ad Hoc screen 500 in FIGS. 5(a) and 5(b).

As shown in FIG. 2, the Details panel 230 can also include a "Comment" box 236, or an "Attachment" button 238 or both. According to an embodiment, the Comment box 236 is initialized to be blank and can be edited to contain any text, which is saved when the "Save & Close" button 204, or the "Save" Button 206, is actuated. According to an embodiment, the comment entered by the user is saved together with user data and a timestamp, for the cube cell addressed by the source dimension combinations, or the cube cell addressed by the target dimension combinations, or for both. According to an embodiment, the Attachment button 238 is configured to allow a user to attach one or more types of documents, for example, an Excel™ spreadsheet, a Word™ document or an email. According to an embodiment, the data processor 128 (FIG. 1) is configured to store the document(s) (i.e. attachments) in memory, e.g. the storage module 134. The storage module 134 includes a data structure or the like to associate the attachment(s) with the dimension member or cell.

According to another aspect, if the Template report screen 400 (FIG. 4(a) and FIG. 4(b)) or the Ad Hoc report screen 500 (FIG. 5(a) and FIG. 5(b)) comprise statistical accounts (i.e. non-accounting accounts) or a statistical or non-accounting data object is clicked, the application 122 is configured to display or invoke a data adjustment processor screen as depicted in FIG. 3 and indicated generally by reference 300. The application 122 further comprises a data adjustment processor module, for example, in the data processor 128 (FIG. 1), which is configured to perform the processing and logic functions associated with the operation of the data adjustment screen 300, for example, as described in more detail below.

Referring to FIG. 3, the data adjustment processor screen 300 according to an embodiment is configured with a "Member Selection" panel 310 and a "Details" panel 330. The Member Selection panel 310 comprises "Source" dimension members 312 and "Target" dimension members 314, and includes respective "Current Value" fields 316 and 317, and respective "Resulting Value" fields 318 and 319. The Source dimension members 312 are initialized to the dimension member values corresponding to the selected statistical or non-accounting data object or cell. According to an embodiment, the Target dimension members 314 are initialized to a default values corresponding to the source dimensions. According to an embodiment, the members of the Target dimensions 314 can be edited to be any leaf or editable Account members for which the user has update access or privileges. For example depicted in FIG. 3, the members for the Target dimension 314 comprise "Salesperson" 340, "Product" 342, and "Time" 344. Additional Target dimensions 314 are accessed using a scroll bar or similar navigation tool 350, which is configured to display a list or screen of other target dimensions in response to a user input, for example, a user mouse click.

According to an embodiment and as shown in FIG. 3, the Details panel 330 comprises a "Source" change value field 332, a "Comment" field or box 334, and a button 336 for including an attachment. As also shown in FIG. 3, the data adjustment screen 300 includes a "Version" field 302. The Version field 302 is configured for displaying the version of the selected cell, i.e. the cell from which the data adjustment screen 300 is invoked. The data adjustment screen 300 can also include a "Save & Close" button 304, a "Save" button 306 and a "Close" button 308, which are configured to operate in a manner similar to that described above for the data transfer screen 200.

According to an embodiment, the data adjustment screen 300 and the data adjustment processor module or component (i.e. in the data processor 128 FIG. 1) are configured to initialize as follows when the data adjustment screen 300 is opened or invoked:
- the Version field 302 is initialized to the version of the cell from which the data adjustment screen 300 was activated
- the Current Value field 316 is initialized to the numerical value in the cell from which the data adjustment screen 300 was activated
- both the Source 312 and the Target 314 dimension members are initialized to the dimension members for the cell from which the data adjustment screen 300 was activated or invoked
- the Source Change field or box 332 is initialized to be zero
- the Comment field or box 334 is initialized to blank The following fields in the data adjustment screen 300 can be edited as follows:
- the members of the Target dimensions 314 can be edited to be any leaf members or any editable account members for which the user has update access or privileges the Source Change field or box 332 can be edited to contain a numerical value the Comment field or box 334 can be edited to contain any text or comment According to an embodiment, the system is configured to operate or function as follows:

the Source Current Value field 316 is set to the value from the cube for the selected dimension members that relate to the cell in the calling screen (e.g. the Template Style Report screen 400—FIG. 4 or the Ad Hoc Style Report screen 500—FIG. 5)

the Target Current Value field 317 is set to the value from the cube for the selected dimension members that are displayed on the data adjustment screen 300; and this value changes if the user selects different Target dimension members, for example as described above the Source Change field 332 is set to the product of −1 AND the value in the Source Current Value field 316 the Source Resulting Value field 318 is set to the SUM of the Source Current Value field 316 and the Source Change field 332 the Target Resulting Value field 319 is set to the value of the Target Current Value field 317 MINUS the Source Change field 332 if the user enters a value in the Source Change field 332, the system is configured to set the Source Resulting Value field 318 to the SUM of the Source Current Value field 316 and the Source Change field 332, and the Target Resulting Value field 319 is set to the value of the Target Current Value field 317 MINUS the Source Change field 332

According to another aspect, the data adjustment screen 300 and the data adjustment application 128 are configured to perform the following validation when a Target dimension member 314 is selected:

if the selected Target dimension member is not a Statistical account, then the system displays the following warning message, for example, in a dialog box (not shown): Values cannot be transferred between Statistical accounts and other account types. On clicking an OK button, the user is returned to the data adjustment screen 300 otherwise, the Target Current Value box 317 is set to the value from the cube for the selected target dimension members 314 the Target Resulting Value field 319 is set to the value of the Target Current Value field 317 MINUS the Source Change field 332

According to an embodiment, in response to the Save button 306 being clicked, the data adjustment screen 300 is configured to perform the following validations:

if the values for the Target dimension member 314 are all the same as the values for the Source dimension member 312, then the system displays the following warning message, for example, in a dialog box (not shown): No data changes can be made because all Target dimension members are the same as the Source dimension members. On clicking an OK button, the user is returned to the data adjustment screen 300.

If the user clicks the Save&Close button 304 or the Save button 306, the changes are saved to the cube (i.e. the cell represented by the Source selected members is set to the value of the Source Resulting Value field 318 and the cell represented by the Target selected members for all dimensions is set to the value of the Target Resulting Value field 319), and an audit log is generated as described in more detail below. If the user clicks the Close button 308, then no changes are saved to the cube, comments or the audit log, and control is return to the calling screen.

According to another embodiment, the data adjustment screen 300 and/or the data adjustment processor module (e.g. implemented in the data processor 128 FIG. 1) are configured to generate an audit log. According to an embodiment, the audit log comprises a data structure 136 (FIG. 1) configured in the storage module 132 (FIG. 1). According to an embodiment, the data structure 136 comprises the following data fields or elements for exemplary audit log:

For:
Dim 1: (Dim1MemberID)Dim 1MemberDesc
Dim2: (Dim2MemberLD)Dim2MemberDesc
Dim3: (Dim3MemberLD)Dim3MemberDesc
The following adjusted by 9,999.99:
Dim4: (Dim4AMemberID)Dim4AmemberDesc
Dim5: (Dim5AMemberID)Dim5AMemberDesc
Dim6: (Dim6A_MemberLD)Dim6AmemberDesc
The following adjusted by 8,888.88
Dim4: (Dim4BMemberID)Dim4BMemberDesc
Dim5: (Dim5BMemberID)Dim5BMemberDesc
Dim6: (Dim6BMemberID)Dim6BmemberDesc Where:
"Dim1" to "Dim3" are the dimensions that were not changed between the Source and the Target (including the Version)
"(Dim1MemberID)Dim1MemberDesc", "(Dim4MemberID)Dim4MemberDesc" to "(Dim4MemberID)Dim4MemberDesc are the selected members of those dimensions
"Dim4 to Dim6" represent the dimensions that were changed between the Source and the Target
"Dim4AmemberID" is the Source Dim4 member that was adjusted
"Dim4BmemberID" is the Target Dim4 member that was adjusted
($) 9,999.99 is the Source Change value, displayed using the numerical format configured for the cell from which the data adjustment screen was initiated
($) 8,888.88 is the Target Change value, displayed using the numerical format configured for the cell from which the data adjustment screen was initiated According to an embodiment, the data structure for an audit log can include the following additional information or fields: User, Date and Time; Module; and Event and Category. The User, Date and Time fields correspond to the current user, the current date and the current time, respectively. The Module can be either "Templates" or "Ad Hoc Analysis", and will depend on how the data adjustment screen 400 was accessed, for example, from the Templates screen 400 in FIG. 4(*a*) and FIG. 4(*b*), or the Ad Hoc screen 500 in FIGS. 5(*a*) and 5(*b*).

Reference is now made to FIGS. 6(*i*) to 6(*vii*) which further illustrate the operation of the data transfer screen 200 according to an embodiment of the invention. In FIGS. 6(*i*) to 6(*vii*), the data transfer screen is indicated by reference 200' and corresponds to the data transfer screen 200 of FIG. 2. The elements and components of the data transfer screen 200' are also indicated by "primed" reference numerals and correspond to the elements and components for the data transfer screen 200 as described above.

Figure 6I:
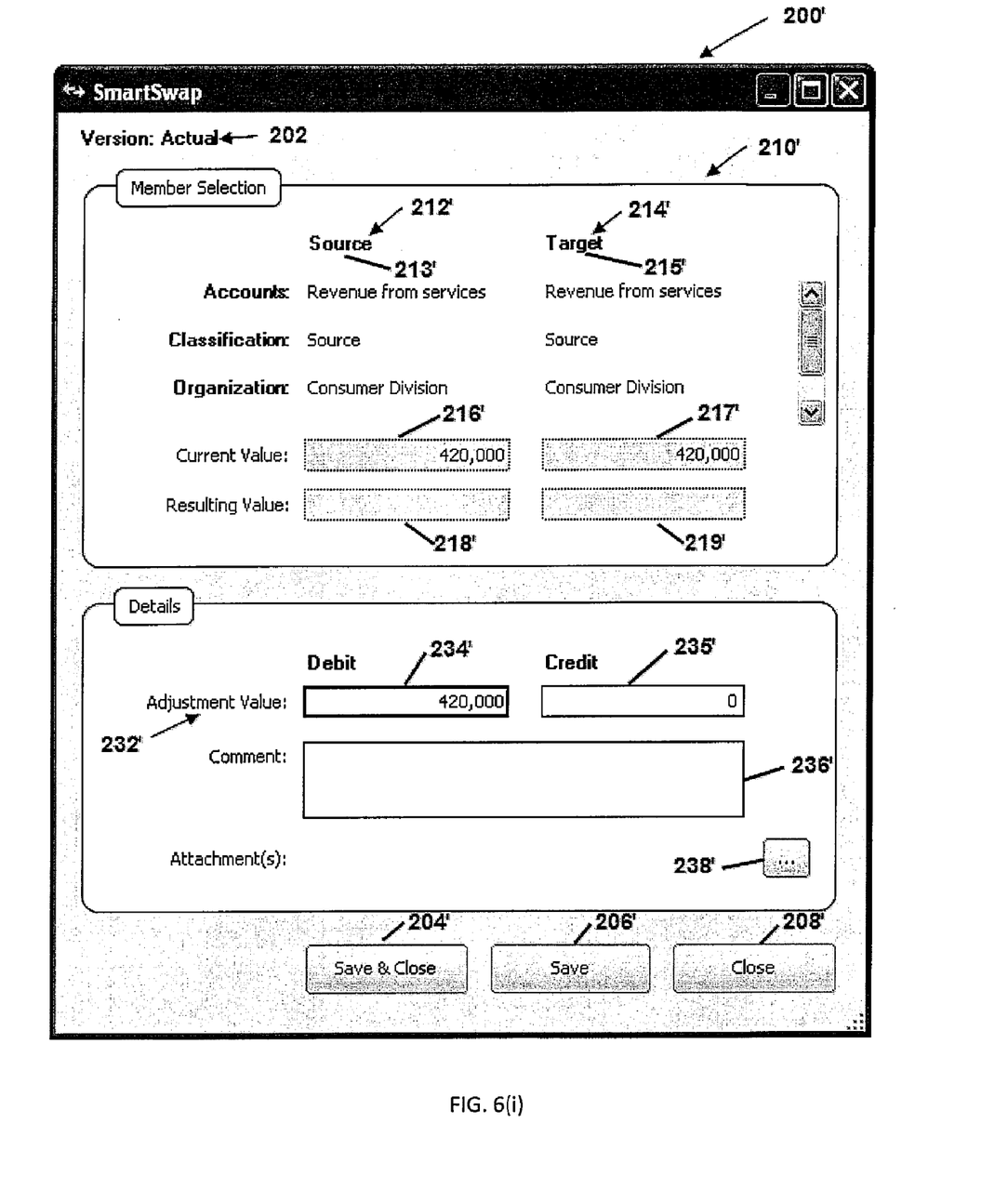
Figure 6V:
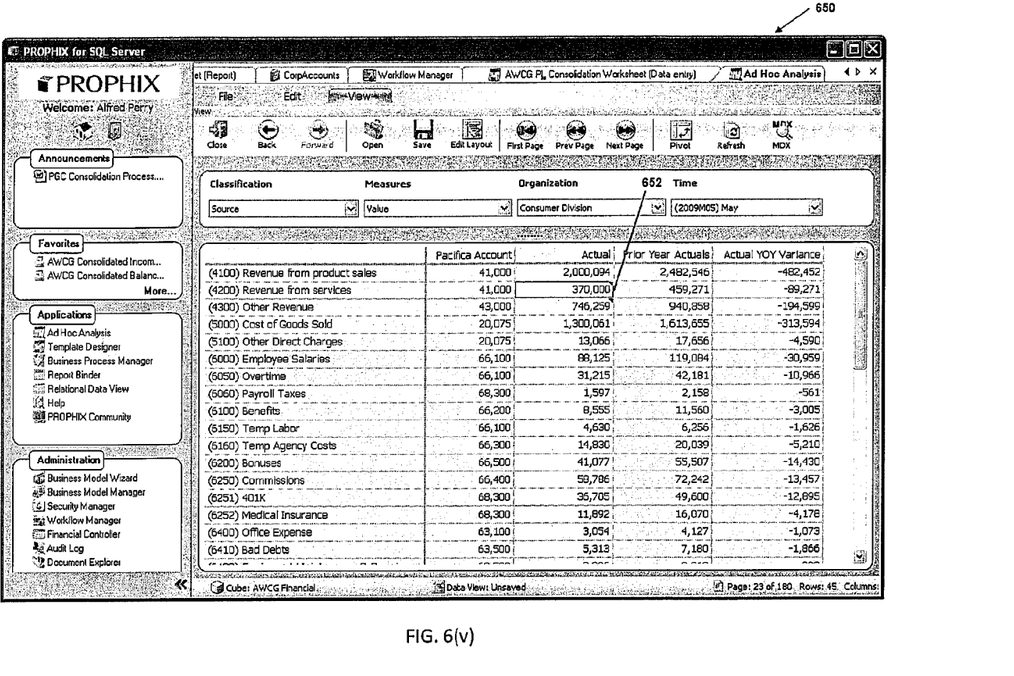

With reference to FIG. 6(*i*), the data transfer screen 200' is invoked or displayed in response to a data object, for example, the data object 430-1*b* (FIG. 4(*a*)) being clicked and the "Smart Swap" menu item 442 (FIG. 4(*b*)) being selected from the drop-down list box 440 (FIG. 4(*b*)), as described above. In this example, the data object 430-1*b* (FIG. 4(*a*)) corresponds to the "Revenue from Services" line item and the dimension member values for the Revenue from Services are presented for the Source dimension member 212' as depicted in FIG. 6(*i*). According to an embodiment, the default values for the Target dimension member 215' comprise the dimension member values for the Revenue from Services dimension as also shown in FIG. 6(*i*). The current value for the Revenue from Services source dimension is $420,000 which is presented in the Current Value field 216' (and by default also in the Current Value field 217' for the Target dimension member 215'). According to an embodiment, the Target field 215' comprises an active field or link and is configured to respond to a user input, for example, a mouse click. In response to being clicked, the data transfer processor module is configured to display a Dimension Selector screen or window 620 for selecting a Target dimension member. According to this example, the screen 620 comprises an Accounts screen with a window or panel 622 configured with the accounts that can be selected as a Target dimension for the Source dimension (i.e. "Revenue from Service"). According to an embodiment, each of the accounts or members comprises an active data object or field, and in response to one of the accounts being clicked or selected, for example, the Other Revenue account 626, the Dimension Selector screen 620 is configured to display the selected account in a Selected Member panel 624, for example, as indicated by reference 626'. According to an embodiment, the Dimension Selector screen 620 may be configured with a "Search" function accessed by a Search tab 628. The Search function is configured to allow a user to search for other accounts or dimension members.

In response to the "Other Revenue" account or dimension member 626' (FIG. 6(*ii*)) being selected, the data transfer processor module populates the Target dimension member 214' with the values and information corresponding to the Other Revenue dimension 626'. For instance as shown in FIG. 6(*iii*), the Accounts field 240' displays "Other Revenue", the Classification field 242' displays "Source" and the Organization field 244' displays "Consumer Division". In this example, the user wishes to transfer, i.e. add or debit $420,000 from the "Revenue from Services" account (i.e. the Source Dimension 212') to the "Other Revenue" account (i.e. the Target Dimension 214'). The adjustment value, i.e. $420,000, is entered in the Debit input field 234', and in response to the user exiting the data entry field, the data transfer processor module applies the debit amount to the Current Value 630 of the Target dimension member 214', and the result is displayed or presented in the Resulting Value field 632. Similarly, the data transfer processor module is configured to update the Resulting Value field 634 for the Source dimension member 212. In this example, the resulting value for the Source dimension member 212 is "0".

Reference is next made to FIG. 6(*iii*), which further illustrates operation of the data transfer screen 200 and the data transfer processor module according to another aspect. In this example, it is determined that the $420,000 debit amount from the Revenue Services line item was incorrectly posted and needs to be corrected. To make the correction, the user enters the correct amount, for example, $50,000, in the Debit field 640 for the Adjustment Value 232'. In response to the user exiting the data entry field, the data transfer processor module applies the debit amount to the Current Value 644 of the Target dimension member 214', and the result is displayed or presented in the Resulting Value field 646. Similarly, the data transfer processor module is configured to update the Resulting Value field 642 for the Source dimension member 212. In this example, the resulting value for the Source dimension member 212 is "$370,000" (i.e. $470,000-$50,000). As also shown in FIG. 6(*iv*), the user enters a comment in the Comment box 648. According to an embodiment, the data transfer processor module is configured to save the entered comments in the database or audit log 132 (FIG. 1). According to an embodiment, the comments entered in the Comments box 236' are saved in memory as "cell comments" which can be viewed or accessed from a "Cell Comments" screen having a form as shown in FIG. 6(*vii*) and indicated generally by reference 670. According to an embodiment, the Cell Comments screen 670 includes a column 672 showing the comments in rows. The comment row can include an Add button 674 for adding an attachment.

Referring back to FIG. 6(*iv*), the Attachment button 238' provides the capability for a user to attach a document related to the data transfer or change. The document can comprise, for example, an email giving executive authorization for making the change. In response to the user clicking the "Save & Close" button 204', the data adjustment screen 200' and the data transfer processor module 128 (FIG. 1) are configured to update the member (i.e. cell) for the Source Dimension 212' and the member (i.e. the cell) for the Target Dimension 214' in the OLAP database 140 (FIG. 1). In response to the close function configured for the Save&Close button 204', control from the data transfer screen 200' is returned to the calling screen, in this case, the Template style report screen shown in FIG. 6(*v*) and FIG. 6(*vi*) and indicated generally by reference 650.

As shown in FIG. 6(*v*), the data object originally indicated by reference 430-1*b* in FIG. 4(*a*) has been updated as indicated by reference 652 by the operation of the data transfer screen 200 and data transfer processor module to the "resulting value" (e.g. $370,000 as indicated reference 642 in FIG. 6(*iv*)). The updated value 652 corresponds to the adjusted value stored in the OLAP database 140 (FIG. 1) for the Source Dimension member or cell. If the user wishes to perform another operation on the data object 652, the user clicks the data object 652 and in response, the drop-down box or list 660 is displayed giving the user the option 662 of accessing the data transfer screen 200, or other functions listed in the drop-down box 660.

The data adjustment screen 300 (FIG. 3) is configured to operate in manner similar to the data transfer screen 200' (FIG. 6(*i*)) except in the context of statistical or non-accounting accounts or transactions.

The functionality and features associated with the data transfer and data adjustment processors or modules 128 (FIG. 1) and/or the server 120 (FIG. 1) and/or the client machines 110 (FIG. 1) and/or the user interface screens or windows, for the data adjustment and data transfer processors or modules, indicated generally by reference 200 and 300 (FIGS. 2 to 6) as described above and in accordance with the embodiments may be implemented in the form of one or more software objects, components, or computer programs or program modules in the server and/or the client machines. Further, at least some or all of the software objects, components or modules can be hard-coded into processing units and/or read only memories or other non-volatile storage media in the mobile communication device, server and/or other components or modules depicted in the drawings. The specific implementation details and coding details for the software objects and/or program modules will be within the knowledge and understanding of one skilled in the art.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A system for processing data between a source cell and a target cell for an OLAP database, said system comprising:
   a component configured for selecting the source cell based on one or more dimensions in the OLAP database and the source cell having a value derived from the OLAP database;
   a component configured for selecting the target cell based on one or more dimensions in the OLAP database;
   a component configured for receiving an adjustment value and applying said adjustment value to the source cell;
   a component configured for applying said adjustment value to the target cell to generate a modified target cell value; and
   a component configured for storing the modified source cell value in the OLAP database, and a component configured for storing the modified target cell value in the OLAP database.

2. The system as claimed in claim 1, further including a component configured for rendering said modified source cell value.

3. The system as claimed in claim 2, wherein said component configured for applying said adjustment value is further configured to apply said adjustment value as a credit value or as a debit value to the target cell.

4. The system as claimed in claim 3, further including a component for generating an audit log associated with the source cell or the target cell, and said component being configured for storing said audit log in memory.

5. The system as claimed in claim 3, further including a component for generating a comment associated with the modification of the source cell and said component being configured for storing said comment in memory for future reference.

6. The system as claimed in claim 5, wherein said component for generating a comment is configured to associate an attachment with the modification of the source cell and store said attachment in memory for future reference.

7. The system as claimed in claim 2, wherein said component for rendering comprises a graphical user interface element and said graphical user interface element is configured to be responsive to an input to invoke a graphical user interface screen, and said graphical user interface screen being configured for receiving said adjustment amount, and including graphical user interface elements for specifying said adjustment amount as a credit value or as a debit value.

8. A computer-implemented method for processing data between a source cell and a target cell for an OLAP database, said method comprising:
   selecting the source cell based on one or more dimensions in the OLAP database and the source cell having a value derived from the OLAP database;
   selecting the target cell based on one or more dimensions in the OLAP database;
   receiving an adjustment value as an input and applying said adjustment value to the source cell;
   applying said adjustment value to the target cell to generate a modified target cell value; and
   storing the modified source cell value in the OLAP database, and storing the modified target cell value in the OLAP database.

9. The computer-implemented method as claimed in claim 8, where said adjustment amount is selectively applied to the target cell as a debit value or a credit value.

10. The computer-implemented method as claimed in claim 8, further including generating an audit log associated with the source cell or the target cell and storing said audit log.

11. The computer-implemented method as claimed in claim 8, further including associating an attachment with the source cell or the target cell.

12. A computer program product for processing data between a source cell and a target cell in an OLAP database, said computer program product comprising:
   a storage medium configured to store computer readable instructions;
   said computer readable instructions including instructions for,
   selecting the source cell based one or more dimensions and the source cell having a value derived from the OLAP database;
   selecting the target cell based on one or more dimensions in the OLAP database;
   receiving an adjustment amount and applying said adjustment amount to the source cell;
   applying said adjustment amount to the target cell to generate a modified target cell value;
   storing the modified source cell value in the OLAP database; and
   storing the modified target cell value in the OLAP database.

13. The computer program product as claimed in claim 12, further including instructions for generating a display window for a graphical user interface and configuring said display window with a field for specifying said adjustment amount as a debit value and a field for specifying said adjustment amount as a credit value.

14. The computer program product as claimed in claim 12, further including instructions for generating a display window for a graphical user interface and configuring said display window to display eligible target dimension members.

15. The computer program product as claimed in claim 14, wherein said eligible target dimension members comprise one or more leaf member or editable members of accounts or dimensions for which a user has access privileges.

* * * * *